United States Patent [19]

Konucik

[11] 4,156,396

[45] May 29, 1979

[54] ROOT IRRIGATION DRIPILATOR DEVICE WITH SPRAY HEAD

[76] Inventor: George J. Konucik, P.O. Box 9482, Richmond, Va. 23228

[21] Appl. No.: 859,452

[22] Filed: Dec. 12, 1977

[51] Int. Cl.² ............................................. A01G 29/00
[52] U.S. Cl. .................................... 111/7.1; 47/48.5; 62/12; 239/207; 239/268; 239/289
[58] Field of Search ................. 61/12, 13; 47/48.5; 111/7.1; 239/207, 276, 273, 266, 267, 268, 289

[56] References Cited

U.S. PATENT DOCUMENTS

| | | | |
|---|---|---|---|
| 986,003 | 3/1911 | von Hohenstein | 239/207 |
| 1,496,645 | 6/1924 | Kaufmann | 239/267 X |
| 1,731,555 | 10/1929 | Williams | 239/267 |
| 1,997,097 | 4/1935 | Bartlett | 111/7.1 |
| 2,214,083 | 9/1940 | Lester | 239/276 X |
| 2,505,174 | 4/1950 | Daniels | 111/7.1 |
| 2,790,403 | 4/1957 | Larsen | 111/7.1 |
| 3,006,558 | 10/1961 | Jacobs | 239/267 |
| 3,026,827 | 3/1962 | Cunningham | 111/7.1 |
| 3,030,031 | 4/1962 | Barker | 239/207 X |
| 3,633,826 | 1/1972 | Baker | 239/276 X |

FOREIGN PATENT DOCUMENTS

| | | | |
|---|---|---|---|
| 253557 | 12/1962 | Australia | 239/207 |
| 798638 | 11/1968 | Canada | 111/7.1 |
| 384156 | 10/1923 | Fed. Rep. of Germany | 47/48.5 |
| 824277 | 11/1951 | Fed. Rep. of Germany | 111/7.1 |
| 1568640 | 5/1969 | France | 239/276 |
| 434853 | 10/1967 | Switzerland | 61/12 |
| 457083 | 11/1936 | United Kingdom | 47/48.5 |
| 122989 | 2/1959 | U.S.S.R. | 111/7.1 |

*Primary Examiner*—Edgar S. Burr
*Assistant Examiner*—Steven A. Bratlie

[57] ABSTRACT

This device consists primarily of a main body with perforated sleeve means, for insertion into a ground surface, for the purpose of introducing a controlled amount of water and liquid fertilizer to plant roots underground. It includes a manually controlled valve, and is connectable in plurality with similar units that will receive liquids from drum means.

1 Claim, 4 Drawing Figures

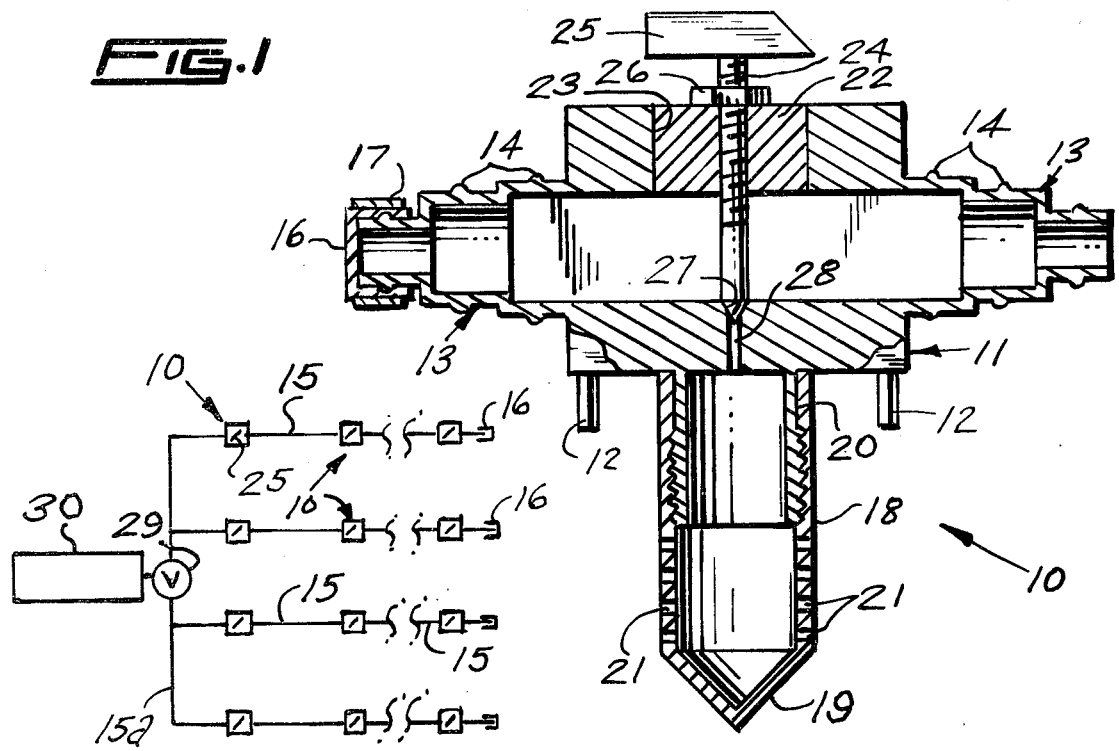
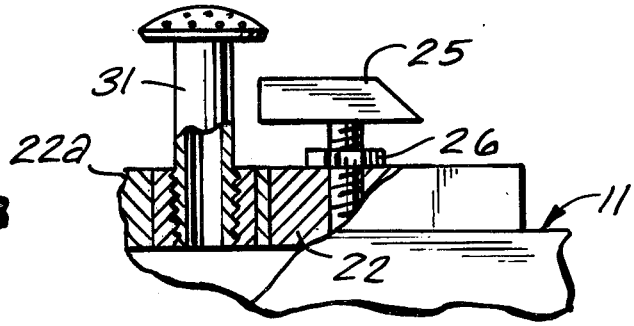
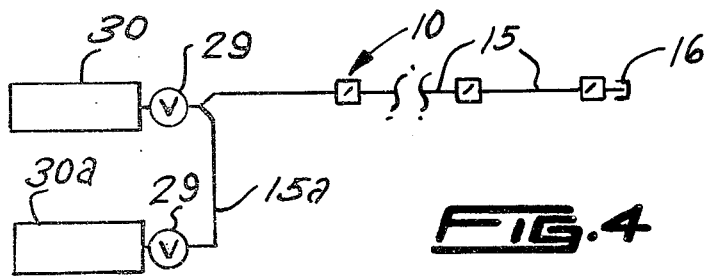

ROOT IRRIGATION DRIPILATOR DEVICE WITH SPRAY HEAD

This invention relates to irrigation devices, and more particularly, to a root irrigation dripilator device.

It is, therefore, the principal object of this invention to provide a root irrigation dripilator device, which will provide irrigation to the roots of plants, without wasting water upon the ground surface.

Another object of this invention is to provide a root irrigation dripilator device which will maintain a constant supply of moisture to plant roots directly, and will thus minimize weed and grass growth, and will lessen cultivation and weeding.

Another object of this invention is to provide a root irrigation dripilator device, which may be buried beneath the ground surface, or supported above the ground surface.

A further object of this invention is to provide a root irrigation dripilator device, which will have a controlled rate of flow to the root area.

A still further object of this invention is to provide a root irrigation dripilator device, which will encourage healthy plant growth and production, regardless of drought conditions.

Other objects of the invention are to provide a root irrigation dripilator device, which is simple in design, inexpensive to manufacture, rugged in construction, and efficient in operation.

These, and other objects, will be readily evident, upon a study of the following specification, and the accompanying drawing, wherein:

FIG. 1 is a vertical view of the present invention, shown in section and elevation;

FIG. 2 is a schematic plan view of the invention, showing a plurality of the devices coupled with a drum of water;

FIG. 3 is a fragmentary and vertical view in elevation, showing a modified form of FIG. 1, and FIG. 4 is a schematic plan view, showing a plurality of the devices coupled to a drum of water and to a liquid plant food or fertilizer filled drum.

According to this invention, a device 10 is shown to include a hollow and rectangular configurated body 11, having a plurality of legs 12 for supporting device 10 above the ground surface, if desired. A nozzle 13, on each end of main body 11, is provided with annular ridges 14, for frictionally receiving lengths of hose 15. A cap 16 is removably received on a nozzle 13, when one of the devices is on the end of a line of the coupled devices, and a clamp 17 is received thereon, to hold it in place.

A sleeve 18, having a pointed end 19, is threaded onto a threaded projection 20 of main body 11, and sleeve 18 is provided with a plurality of spaced-apart openings 21, through its wall, for the passage of water into the root area of the plants. A sleeve 22 is secured fixedly in opening 23 at the top of main body 11, and threadingly receives valve 24, having a pointer type knob 25 on one end. When knob 25 is set in any desired position, it is locked in place by means of the lock nut 26, which will abut with the top face of sleeve 22.

The opposite end of valve 24 is pointed, so as to seat on valve seat 27, in order, to close off the flow of water within opening 28.

It shall be noted that device 10 is also adaptable to be coupled to common water outlets, as are found in cities and suburbs, so as to accommodate those people who have small gardens.

As shown in FIG. 2, hoses 15 interconnect devices 10 with each other, and a main valve 29, in hose 15a, serves as control means for water flow from the water filled drum 30.

The modified form, shown in FIG. 3, includes in addition, a sleeve 22a, in which is the threaded spray nozzle 31, for use in a well known manner.

Referring now to FIG. 4 of the drawing, devices 10 are shown coupled to both a water-filled drum 30, and a chemical fertilizer-filled drum 30a, by means of hose 15a. This combination enables the simultaneous flow of water and fertilizer.

While various changes may be made in the detail construction, it is understood that such changes will be within the spirit and scope of the present invention, as is defined by the appended claims.

What I now claim is:

1. A root irrigation dripilator device, comprising, in combination, a rectangular main body, a liquid flow control valve secured in said main body, and a pointed sleeve removably received on said main body, for insertion downward into the soil, and directing a liquid flow to plant roots; said main body having a plurality of spaced-apart, downward legs on its underside, for supporting said body above the soil surface, each said leg having a horizontal, flat face on its bottom, for resting upon said soil surface; said pointed sleeve being threadingly engaged on a hollow downward projection of said main body, said projection being centrally disposed between said legs, a plurality of spaced-apart openings through a side wall of said pointed sleeve, and water from an interior chamber of said main body being dispensed outwardly through said openings of said pointed sleeve; said liquid flow control valve being removably seated on a valve seat in said chamber, and aligning with a longitudinal axis of a vertical drain opening of said main body, said valve being screw-threaded in a sleeve member secured fixedly in an opening in the top of said main body, a pointed knob rigidly affixed on an externally extending upper end of said valve, a nipple at each opposite end of said main body communicating with said chamber, said nipples selectively being fitted either with a hose, or an end cap; and a second sleeve member, also in a top of said main body, having a spray nozzle for above-ground spraying, extending upwardly therethrough, and communicating with said chamber.

* * * * *